United States Patent
Yajima et al.

(10) Patent No.: US 8,405,669 B2
(45) Date of Patent: Mar. 26, 2013

(54) DISPLAY CONTROL DEVICE, DISPLAY DATA SERVER, AND DISPLAY CONTROL SYSTEM

(75) Inventors: Hideaki Yajima, Osaka (JP); Hidehiko Sin, Osaka (JP)

(73) Assignee: Panasonic Corporation, Osaka (JP)

( * ) Notice: Subject to any disclaimer, the term of this patent is extended or adjusted under 35 U.S.C. 154(b) by 456 days.

(21) Appl. No.: 12/674,030

(22) PCT Filed: Jul. 10, 2008

(86) PCT No.: PCT/JP2008/001853
§ 371 (c)(1),
(2), (4) Date: Feb. 18, 2010

(87) PCT Pub. No.: WO2009/025066
PCT Pub. Date: Feb. 26, 2009

(65) Prior Publication Data
US 2011/0187738 A1 Aug. 4, 2011

(30) Foreign Application Priority Data
Aug. 22, 2007 (JP) .................................. 2007-215467

(51) Int. Cl.
*G09G 5/00* (2006.01)

(52) U.S. Cl. ........ 345/581; 715/273; 715/200; 709/219; 709/203; 709/217; 345/418; 345/428; 345/619

(58) Field of Classification Search .................... None
See application file for complete search history.

(56) References Cited

U.S. PATENT DOCUMENTS

| | | | |
|---|---|---|---|
| 6,578,073 B1 * | 6/2003 | Starnes et al. | 709/219 |
| 7,421,657 B1 * | 9/2008 | Dawson-Granados et al. | 715/739 |
| 7,669,141 B1 * | 2/2010 | Pegg | 715/781 |
| 7,786,999 B1 * | 8/2010 | Reid | 345/581 |
| 2006/0224994 A1 * | 10/2006 | Cheemalapati et al. | 715/808 |
| 2008/0150952 A1 * | 6/2008 | Koarai | 345/531 |
| 2008/0235594 A1 * | 9/2008 | Bhumkar et al. | 715/738 |

FOREIGN PATENT DOCUMENTS

| | | |
|---|---|---|
| JP | 3-98371 | 4/1991 |
| JP | 7-98579 | 4/1995 |
| JP | 2001-83952 | 3/2001 |
| JP | 2005-215333 | 8/2005 |
| WO | WO2008/044821 * | 4/2008 |

OTHER PUBLICATIONS

International Search Report issued Aug. 12, 2008 in corresponding International Application No. PCT/JP2008/001853.

* cited by examiner

*Primary Examiner* — Xiao M. Wu
*Assistant Examiner* — Greg Raburn
(74) *Attorney, Agent, or Firm* — Wenderoth, Lind & Ponack, L.L.P.

(57) ABSTRACT

A display control device (110) is provided that increases the speed of a screen transition when acquiring screen data for display via a network. In the display control device (110), the display acquisition section (112) acquires not only display data corresponding to a transition target screen but also light simulation data that has small data size; and displays a simulated screen, which is a screen generated by the screen generation section (111) based on the light simulation data, until a screen based on the display data is displayed, to thereby provide a comfortable operational feeling without making a user feel a delay of a screen transition process, while reducing the memory consumption.

10 Claims, 11 Drawing Sheets

F I G. 1
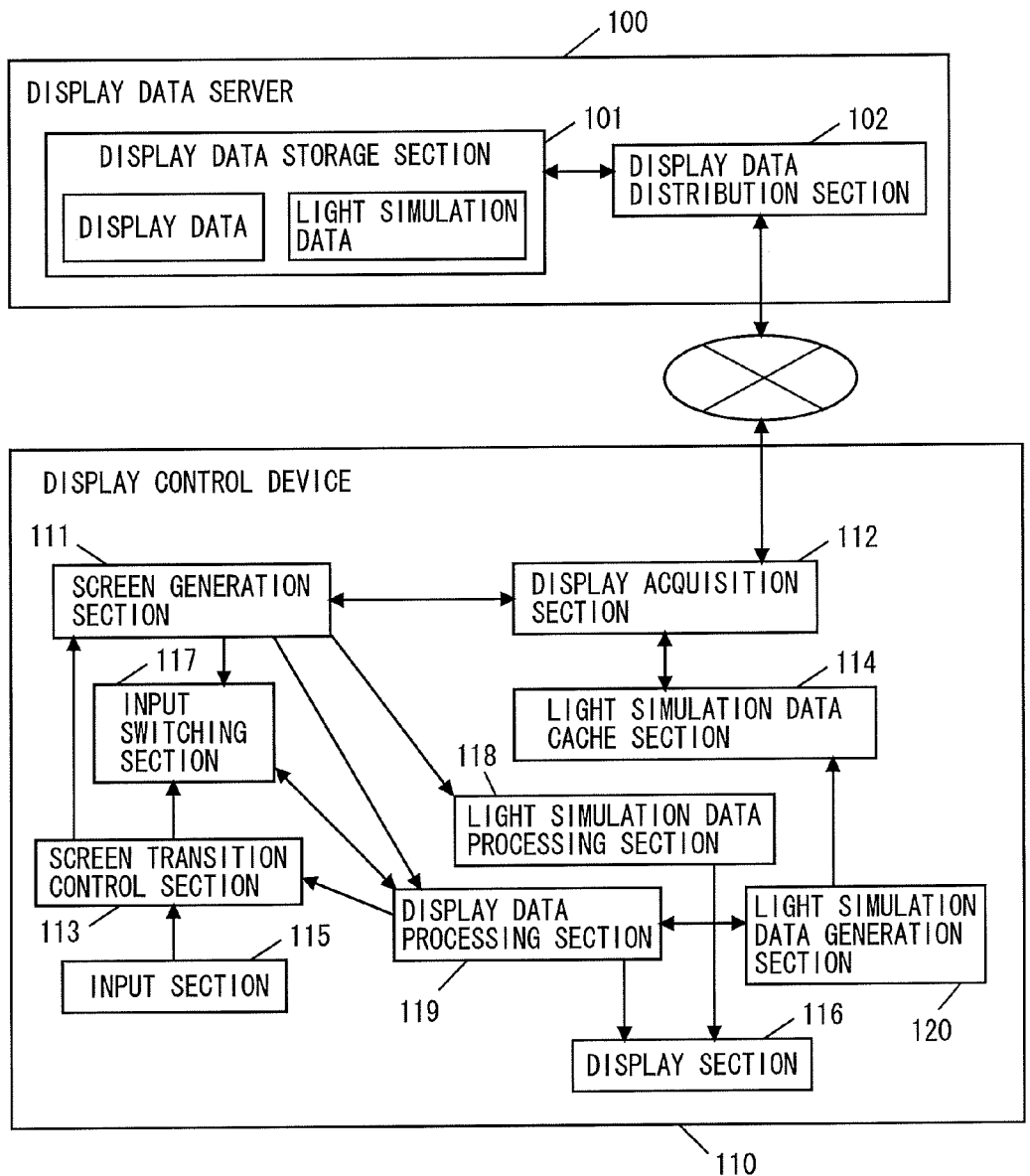

F I G. 2

| SCREEN IDENTIFIER | DISPLAY DATA | LIGHT SIMULATION DATA |
|---|---|---|
| 1 | DISPLAY DATA A | LIGHT SIMULATION DATA a |
| 2 | DISPLAY DATA B | LIGHT SIMULATION DATA b |
| : | : | : |

F I G. 3

| SCREEN IDENTIFIER | LIGHT SIMULATION DATA |
|---|---|
| 1 | LIGHT SIMULATION DATA a |
| 2 | LIGHT SIMULATION DATA b |
| : | : |

F I G. 5
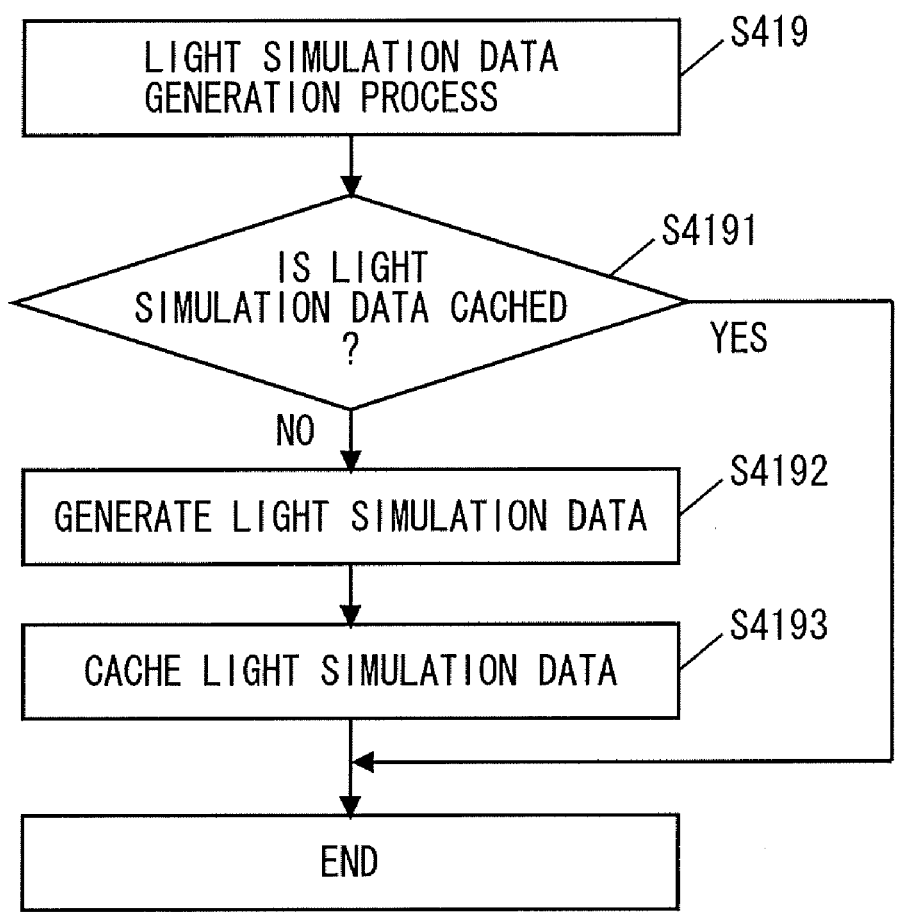

F I G. 6
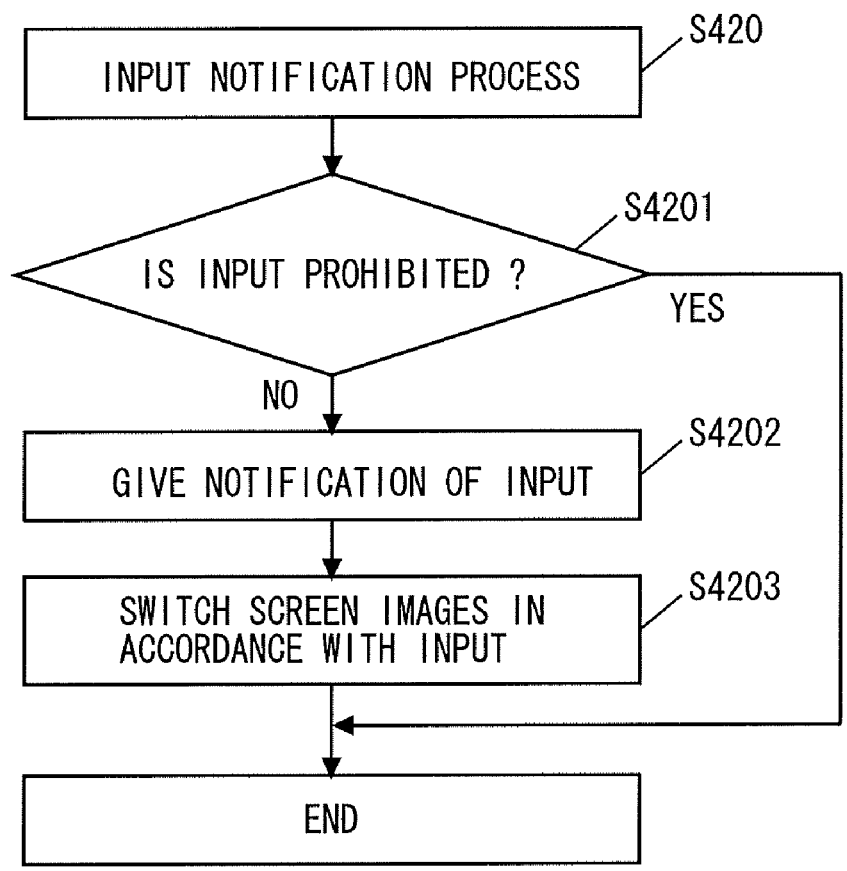

FIG. 7
(a)
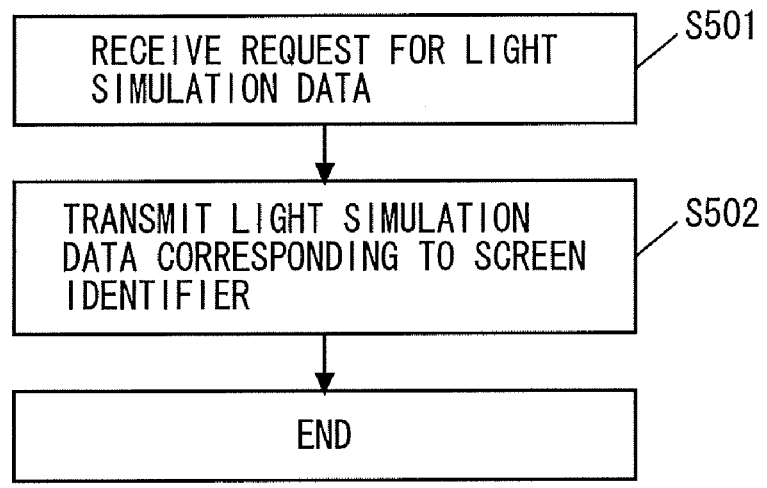
(b)
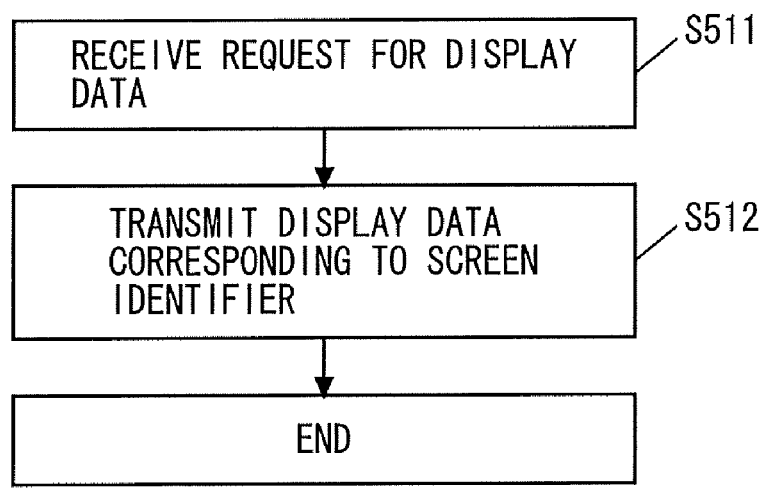

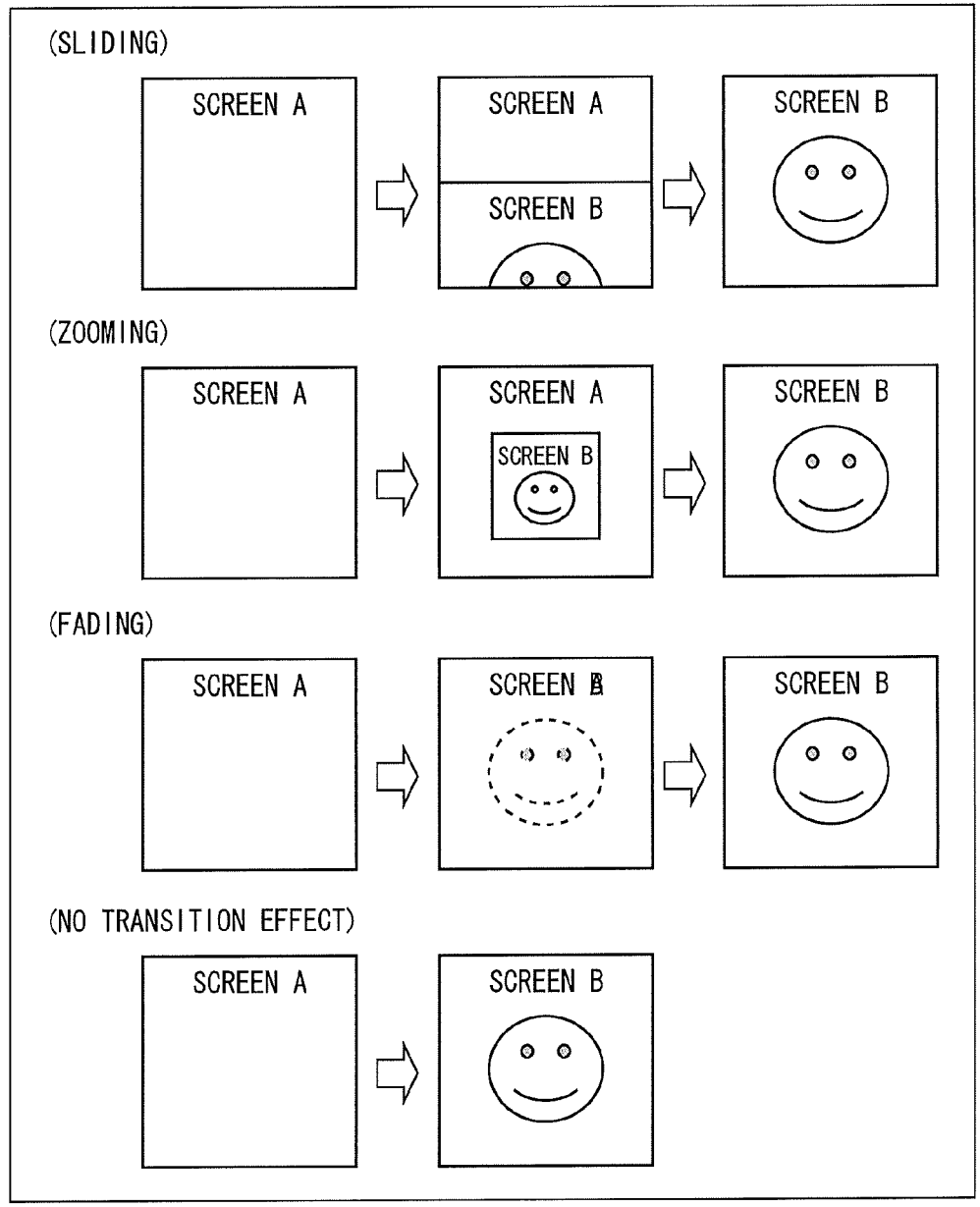

FIG. 11

| SCREEN IDENTIFIER | DISPLAY DATA | LIGHT SIMULATION DATA (AMOUNT-OF-DATA SMALL) | LIGHT SIMULATION DATA (AMOUNT-OF-DATA LARGE) |
|---|---|---|---|
| 1 | DISPLAY DATA A | LIGHT SIMULATION DATA a1 | LIGHT SIMULATION DATA a2 |
| 2 | DISPLAY DATA B | LIGHT SIMULATION DATA b2 | LIGHT SIMULATION DATA b2 |
| .. | .. | .. | .. |

DISPLAY CONTROL DEVICE, DISPLAY DATA SERVER, AND DISPLAY CONTROL SYSTEM

TECHNICAL FIELD

The present invention relates to a display control device, a display data server, and a display control system that control display on a displayed screen, and particularly to a display control device, a display data server, and a display control system that make a screen transition at high speed.

BACKGROUND ART

Conventionally, in an electronic device, such as a mobile phone, a PDA, a digital camera, a digital television, or a digital video recording device, a user operates a graphical user interface (GUI) displayed on a display device, as typified by a CRT display and a liquid crystal display, so that the user can easily use the functions provided by the electronic device. Here, a unit of an operation target displayed on the display device at one time so as to be presented to the user is defined as a screen. Specifically, the screen may be, for example, a screen (select menu screen) that presents a plurality of selectable menus, a screen (pop-up panel screen) that notifies the user of a message, or a screen (content screen) that displays contents such as character information and image information. Further, it is possible to simultaneously display a plurality of screens on the display device.

In recent years, the electronic device can display not only an already installed screen, but also a new screen using screen data downloaded from a server. In conventional display control devices, servers, and systems, the numbers of times pieces of screen data are displayed are counted to select frequently used pieces of screen data, and the selected pieces of screen data are downloaded in advance from a server before a screen transition is made, so that the time until the subsequent screen is displayed is reduced when the screen transition is made (see Patent Document 1, for example).

Patent Document 1: Japanese Patent Publication No. 2913643

DISCLOSURE OF THE INVENTION

Problems to be Solved by the Invention

However, in the conventional display control devices and the like, the screen to be subsequently displayed by the screen transition is not necessarily included in the screens that have been frequently displayed in the past, and therefore it is impossible to display an infrequently used screen at high speed.

To solve the conventional problem described above, an object of the present invention is to provide a display control device, a display data server, and a display control system that can reduce the time until the subsequent screen is displayed when a screen transition is made, and to make the screen transition at high speed, regardless of the use frequency of the screen.

Solution to the Problems

The present invention is directed to a display control device for displaying a screen based on display data acquired via a network. To achieve the above object, the display control device according to the present invention includes: a screen transition control section that receives an event occurring to the displayed screen and gives an instruction to make a screen transition; a light simulation data processing section that generates a screen image based on light simulation data corresponding to the display data; a display data processing section that generates a screen image based on the display data and based also on the event whose notification has been given while the screen is displayed; a screen generation section that, when having received from the screen transition control section the instruction to make a screen transition, requests acquisition of display data corresponding to a transition target screen to thereby acquire one of the display data and light simulation data corresponding to the display data, requests the light simulation data processing section to generate a screen image of the acquired light simulation data, and requests the display data processing section to generate a screen image of the acquired display data; a display acquisition section that, when having received from the screen generation section the request to acquire the display data, outputs to the network a request to acquire one of the display data and the light simulation data corresponding to the display data, and acquires the one of the light simulation data and the display data from the network; a display section that displays the generated screen image based on the light simulation data and the generated screen image based on the display data; and an input switching section that prohibits the display data processing section from being notified of an event while the screen image based on the light simulation data is displayed.

With this structure, it is possible to display a screen image based on the light simulation data until a screen image based on the display data is displayed, and therefore it is possible to provide a comfortable operational feeling without making a user feel a delay of a screen transition process.

Preferably, the display control device further includes a light simulation data cache section that temporarily stores therein the light simulation data acquired by the display acquisition section. In this case, when the requested light simulation data corresponding to the display data is present in the light simulation data cache section, the display acquisition section acquires the light simulation data from the light simulation data cache section.

Further, the display control device may further include a screen transition effect section that combines the screen image generated by one of the light simulation data processing section and the display data processing section with a screen image that is already being displayed on the display section, to thereby provide a screen transition effect.

Further the display acquisition section can change, based on the screen transition effect provided by the screen transition effect section, a type of the light simulation data to be acquired. The type of the light simulation data is classified in accordance with a data size of the light simulation data.

Further, the present invention is also directed to a display data server for distributing display data requested via a network. To achieve the above object, the display data server according to the present invention includes: a display data storage section that stores therein the display data and light simulation data corresponding to the display data; a display data distribution section that receives via the network a request to acquire one of the display data and the light simulation data, and, based on the received acquisition request, outputs to the network the one of the display data and the light simulation data that are stored in the display data storage section; a display data addition section that stores newly input display data in the display data storage section; and a light simulation data generation section that generates a screen image based on the newly input display data stored by the display data addition section, generates, from the screen image, light simulation data corresponding to the newly input display data, and stores the generated light simulation data in the display data storage section.

Further, the present invention is also directed to display control system having a display data server for distributing display data requested via a network and a display control device for displaying a screen based on the display data acquired from the display data server. The display control system includes the display control device and the display data server.

The present invention is also directed to the methods performed by a display control device, a display data server, and a display control system, respectively.

Effect of the Invention

According to the display control device according to the present invention, when a subsequent screen is displayed by a screen transition using display data acquired via a network, the first screen image after the switching is displayed in a simulated manner, using light simulation data, and therefore it is possible to reduce the processing time until the subsequent screen is displayed, and to make the screen transition at high speed.

BRIEF DESCRIPTION OF THE DRAWINGS

FIG. 1 is a block diagram showing an example of the structure of a display control system according to a first embodiment of the present invention.

FIG. 2 is a diagram showing an example of the contents stored in a display data storage section 101 according to the first embodiment of the present invention.

FIG. 3 is a diagram showing an example of the contents stored in a light simulation data cache section 114 according to the first embodiment of the present invention.

FIG. 5 is a flow chart showing a light simulation data generation process performed by the display control device 110 according to the first embodiment of the present invention.

FIG. 6 is a diagram showing the flow of an input notification process performed by the display control device 110 according to the first embodiment of the present invention.

FIG. 7 is a flow chart showing a data transmission process performed by a display data server 100 according to the first embodiment of the present invention.

FIG. 9 is a diagram showing examples of a screen transition effect provided by a screen transition effect section 121 according to the second embodiment of the present invention.

FIG. 10 is a diagram showing an example of the correspondences between display effect patterns and light simulation data types according to the second embodiment of the present invention.

FIG. 11 is a diagram showing the contents stored in a display data storage section 101a according to the second embodiment of the present invention.

Figure 4:
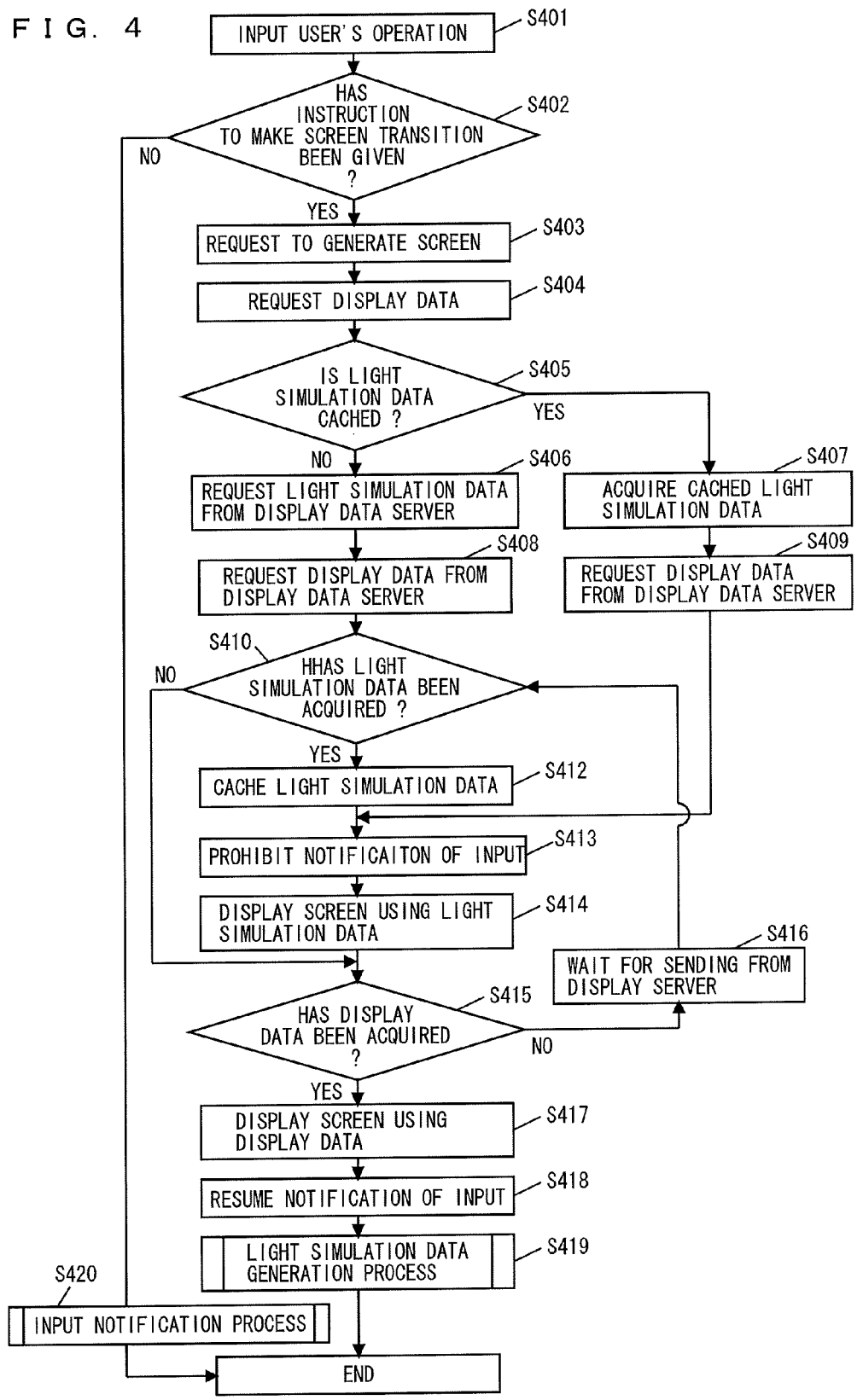
FIG. 4 is a flow chart showing a screen transition process performed by a display control device 110 according to the first embodiment of the present invention.

DESCRIPTION OF THE REFERENCE CHARACTERS 100, 200 display data server
101, 101a display data storage section
102, 102a display data distribution section
103 display data addition section
110, 210 display control device
111 display generation section
112, 112a display acquisition section
113 display transition control section
114 light simulation data cache section
115 input section
116 display section
117 input switching section
118 light simulation data processing section
119, 119a display data processing section
120, 120a light simulation data generation section
121 screen transition effect section
122 light simulation data read-ahead section

BEST MODE FOR CARRYING OUT THE INVENTION

Embodiments of the present invention are described below with reference to the drawings.

First Embodiment

FIG. 1 is a block diagram showing an example of the structure of a display control system according to a first embodiment of the present invention. Referring to FIG. 1, the display control system includes a display data server 100 and a display control device 110. Referring to FIG. 1, the display data server 100 includes a display data storage section 101 and a display data distribution section 102, and is connected to the display control device 110 via a network. The display control device 110 includes a screen generation section 111, a display acquisition section 112, a screen transition control section 113, a light simulation data cache section 114, an input section 115, a display section 116, an input switching section 117, a light simulation data processing section 118, a display data processing section 119, and a light simulation data generation section 120.

In the display data server 100, the display data storage section 101 stores therein display data and light simulation data corresponding to the display data. FIG. 2 shows an example of the contents stored in the display data storage section 101. Referring to FIG. 2, the display data storage section 101 has stored therein: screen identifiers for identifying screens, respectively; and pieces of the display data and pieces of the light simulation data that correspond to the respective screens. Note that here, an example is shown where numbers are used as the screen identifiers; however, character strings such as a URI string may be used.

Here, the display data refers to a GUI as described above, and is data that includes screen data, which is a display content displayed on the display section 116, and also includes procedures for events (e.g., an input event based on a user's operation, an external communication event such as e-mail reception, or an internal event such as a timer) that are received when the screen based on the screen data is displayed. An example of the display data may include: a program, such as a script, that displays a screen; data having written therein the display content of the screen, using a markup language or the like; and a combination of animation data and the script.

Note that the screen data is formed with one or more screen images. A screen image refers to the display content displayed on the display device while one screen is displayed. Specifically, one display content corresponds to one screen image if, for example, display contents are changed due to the movement of the focus position on a screen, changes in characters and images, a change in graphic animation display, or the like.

Further, the light simulation data refers to data that represents the display content that is desired to be first displayed on the displayed screen after a transition has been made to a corresponding screen. For example, the light simulation data is image data, such as a BMP or a JPEG, into which one screen image to be first displayed after a transition has been made is formed as it is from among the screen data. The light simulation data may also be data having written therein a display content, using a markup language or the like. That is, the light simulation data is data characterized by having a smaller amount of data than that of the display data due to the reduction of the procedures included in the display data, the reduction of the number of the screen images forming the screen data, and the like.

Note that the amount of data of the light simulation data may be further reduced due to the reduction of the number of display elements, such as the characters and the images that are contained in each screen image, the reduction of the number of colors and the number of pixels on the screen images, and the like. Note that the data format of the light simulation data may be determined not only based on the reduction of the amount of data, but also in accordance with the characteristics of the screen generation section 111 of the display control device 110. An example of this may be a method of, when the display data is a script that displays a particular screen and the display control device 110 is provided with hardware for a compressed image expansion process, having the light simulation data stored in advance in a compressed image format to thereby increase the speed of a screen image generation process.

The display data distribution section 102 receives a request from the display control device 110, and sends, to the display control device 110 via the network, display data or light simulation data, each corresponding to the screen identifier whose notification has been given by the display acquisition section 112 of the display control device 110, the display data and the light simulation data being contained in those stored in the display data storage section 101.

In the display control device 110, when having received from the screen transition control section 113 a request to generate a screen, the screen generation section 111 requests the display acquisition section 112 to acquire display data that is necessary for generating a screen corresponding to the specified screen identifier. In addition, when having received display data from the display acquisition section 112, the screen generation section 111 sends the received display data to the display data processing section 119, and requests the display data processing section 119 to generate a screen. When having received light simulation data, the screen generation section 111 sends the received light simulation data to the light simulation data processing section 118, and requests the input switching section 117 to prohibit the notification of an input.

The light simulation data processing section 118 generates a screen image based on light simulation data received from the screen generation section 111, and sends the generated screen image to the display section 116, to thereby cause a screen to be displayed on the display section 116. At this time, the light simulation data processing section 118 only generates the screen image to be first displayed, without performing a process of, for example, analyzing the procedure for switching screen images in accordance with an input. This makes it possible to perform the entire process at high speed.

The display data processing section 119 generates screen data based on display data received from the screen generation section 111, and sends to the display section 116 the screen image to be first displayed, to thereby cause the screen image to be displayed on the display section 116. The display data processing section 119 also instructs the input switching section 117 to resume the notification of an input, and starts switching screen images in accordance with an input from the user. In addition, when having generated the first screen image, the display data processing section 119 sends the generated screen image to the light simulation data generation section 120, and requests the light simulation data generation section 120 to generate light simulation data. Further, the display data processing section 119 performs a process for an event whose notification has been given by the input switching section 117, and switches screen images as necessary. Furthermore, when having determined that it is necessary to make a transition to a subsequent screen, the display data processing section 119 requests the screen transition control section 113 to make a screen transition, while notifying the screen transition control section 113 of the screen identifier of the transition target.

The display acquisition section 112 receives from the screen generation section 111 a request to acquire display data, and checks whether or not light simulation data corresponding to the specified screen identifier is present in the light simulation data cache section 114. As a result of the check, when the light simulation data is present, the display acquisition section 112 immediately notifies the screen generation section 111 of the presence, and requests the display data server 100 to acquire display data corresponding to the screen identifier. When the light simulation data is not present, the display acquisition section 112 requests the display data server 100 to acquire the light simulation data and the display data. When having received the light simulation data and the display data from the display data server 100, the display acquisition section 112 sends the received light simulation data and display data to the screen generation section 111. In addition, the display acquisition section 112 stores in the light simulation data cache section 114 the light simulation data received from the display data server 100.

The screen transition control section 113 receives an event (e.g., an input event based on a user's operation, an external communication event such as e-mail reception, or an internal event such as a timer) whose notification has been given by the input section 115, and determines whether or not it is necessary to make a screen transition. When having determined that it is necessary to make a screen transition, the screen transition control section 113 requests the screen generation section 111 to generate a screen, while specifying the screen identifier of the transition target. When having determined that it is not necessary to make a screen transition, the screen transition control section 113 notifies the input switching section 117 of the received event. In addition, when having received from the display data processing section 119 a request to make a screen transition, the screen transition control section 113 requests the screen generation section 111 to generate a screen, while specifying the screen identifier of the transition target.

Note that the screen transition control section 113 makes a determination about a screen transition that is common to the system, such as the operation of pressing an end key, but does not make a determination as to whether or not it is necessary to make a screen transition that is specific to each screen, such as clicking a specific button on a displayed screen.

The light simulation data cache section 114 stores therein light simulation data sent by the display acquisition section 112, and sends to the display acquisition section 112 light simulation data requested from the display acquisition section 112. FIG. 3 shows an example of the contents stored in the light simulation data cache section 114. Referring to FIG. 3, the light simulation data cache section 114 has stored therein: screen identifiers for identifying screens, respectively; and pieces of the light simulation data that correspond to the respective screens.

The input section 115 has the function of receiving, for example, an input event based on a user's operation, an external communication event such as e-mail reception, or an internal event such as a timer. Specifically, the input section 115 includes an input device such as keys and a mouse, a port for receiving a signal from an input device, or the like.

The display section 116 is a display device such as a CRT display or a liquid crystal display, or a port for sending a signal to a display device.

The input switching section 117 has the function of transferring to the display data processing section 119 an event whose notification has been given by the screen transition control section 113. When having received from the screen generation section 111 a request to prohibit input, the input switching section 117 cancels a transfer to the display data processing section 119. When having received from the display data processing section 119 a request to resume input, the input switching section 117 resumes a transfer to the display data processing section 119.

When light simulation data corresponding to a screen image that has first been generated by the display data processing section 119 is not stored in the light simulation data cache section 114, the light simulation data generation section 120 converts the screen image, sent by the display data processing section 119, into image data such as a BMP or a JPEG to thereby generate the light simulation data, and stores the generated light simulation data in the light simulation data cache section 114.

Thus, when a screen transition is made, the display control device 110 according to the present invention can use light simulation data to display, in a simulated manner, the screen image to be first displayed after the switching. This makes it possible to reduce the time until the subsequent screen is displayed, and to provide a comfortable operational feeling without making the user feel a delay of the screen transition.

FIG. 4 is a flow chart showing a screen transition process performed by the display control device 110 according to the first embodiment of the present invention. Here, it is assumed that the display control device 110 starts the process when the user inputs an operation via the input section 115 to the display control device 110 (step S401). Note that the screen transition process may be started not only when an operation is input by the user, but also when a communication event or an internal event such as a tinier is received.

The screen transition control section 113 receives the user's operation input via the input section 115, and determines, based on the received user's operation, whether or not it is necessary to make a screen transition (step S402). Here, if a screen is first displayed after power on, such as when the system is started up, the screen transition control section 113 determines that it is necessary to make a screen transition so as to cause an initial screen to be displayed. Alternatively, if a screen is already displayed, when the currently displayed screen is to be switched, as a result of a screen transition that is common to the system, such as the operation of pressing an end key, to a screen whose content cannot be displayed using the display data corresponding to the currently displayed screen, the screen transition control section 113 determines that it is necessary to make a screen transition.

When having determined that it is necessary to make a screen transition ("YES" in step S402), the screen transition control section 113 requests the screen generation section 111 to generate a screen, while notifying the screen generation section 111 of the screen identifier of the transition target (step S403). When having determined that it is not necessary to make a screen transition ("NO" in step S402), the screen transition control section 113 performs an input notification process (step S420), and ends the entire process. Details of the input notification process (step S420) will be described in detail below.

When requested to generate a screen, the screen generation section 111 requests the display acquisition section 112 to acquire display data, while specifying the screen identifier whose notification has been given (step S404).

The display acquisition section 112 checks whether or not light simulation data corresponding to the specified screen identifier is stored in the light simulation data cache section 114 (step S405).

When the corresponding light simulation data is stored ("YES" in step S405), the display acquisition section 112 acquires the light simulation data from the light simulation data cache section 114, and sends the acquired light simulation data to the screen generation section 111 (step S407). Then the display acquisition section 112 requests the display data from the display data server 100, while specifying the screen identifier (step S409), and proceeds to step S413.

When the light simulation data is not stored ("NO" in step S405), the display acquisition section 112 requests the light simulation data from the display data server 100, while specifying the screen identifier (step S406). Then the display acquisition section 112 requests the display data from the display data server 100, while specifying the screen identifier (step S408). Subsequently, the display acquisition section 112 determines whether or not the acquisition of the light simulation data has succeeded (step S410).

When the acquisition of the light simulation data has succeeded ("YES" in step S410), the display acquisition section 112 sends the acquired light simulation data to the screen generation section 111, and then stores the light simulation data in the light simulation data cache section 114 (step S412). When the acquisition of the light simulation data has not succeeded ("NO" in step S410), the display acquisition section 112 proceeds to the process of step S415. That is, the process for the light simulation data is skipped when a given period of time has elapsed in step S410, in consideration of the case where the light simulation data is not sent, such as when the device is connected to the display data server that does not support light simulation data, or when a failure occurs to the display data server. As well as these cases, the process for the light simulation data is also skipped, for example, when the notification of an error has been given, or when the display data has been sent before the light simulation data is sent.

When the light simulation data has been sent, the screen generation section 111 requests the input switching section 117 to prohibit the notification of an input (step S413). The screen generation section 111 sends the light simulation data to the light simulation data processing section 118. The light simulation data processing section 118 generates a screen image based on the sent light simulation data, and sends the generated screen image to the display section 116. This causes a screen to be displayed on the display section 116 (step S414). Note that the screen to be displayed in this case is generated based on the light simulation data, and therefore is not updated due to animation or a key operation. Alternatively, when light simulation data is used that has colors and pixels reduced in number for the reduction of the amount of data, a screen image is displayed that has colors and pixels reduced in number.

Subsequently, the display acquisition section 112 determines whether or not the display data has been acquired from the display data server 100 (step S415). When the display data has not been acquired ("NO" in step S415), the display acquisition section 112 waits for the display data server 100 to send the display data to the display acquisition section 112 (step S410), and returns to step S415. When the display data has been acquired ("YES" in step S415), the display acquisition section 112 sends the acquired display data to the screen generation section 111. The screen generation section 111 sends the sent display data to the display data processing section 119. The display data processing section 119 generates a screen image based on the sent display data, and sends the generated screen image to the display section 116. This causes a screen to be displayed on the display section 116 (step S417). Note that the screen to be displayed in this case is different from that of the light simulation data, and is a standard screen that has colors and pixels not reduced.

Subsequently, the display data processing section 119 requests the input switching section 117 to resume the notification of an input, and starts switching screen images in accordance with an event whose notification has been given (step S418). This makes it possible to switch screen images, such as animation or the shift of focus due to a key operation, which cannot be performed using the light simulation data.

Finally, the display data processing section 119 requests the light simulation data generation section 120 to generate the light simulation data, performs a light simulation data generation process (step S419), and ends the entire process.

FIG. 5 is a flow chart showing the light simulation data generation process performed by the display control device 110 according to the first embodiment of the present invention. This is details of the light simulation data generation process (step S419) shown in FIG. 4.

Referring to FIG. 5, when having received the request from the display data processing section 119, the light simulation data generation section 120 checks whether or not the light simulation data corresponding to the screen identifier of the displayed screen is stored in the light simulation data cache section 114 (step S4191). As a result of the check, when the light simulation data is stored ("YES" in step S4191), the process ends.

When the light simulation data is not stored ("NO" in step S4191), the light simulation data generation section 120 acquires a target screen image from the display data processing section 119, and generates the light simulation data based on the acquired screen image (step S4192). Here, as a method of generating the light simulation data, the bitmap data of the screen image may be used as is for the light simulation data, or a compressed image such as a GIF or a JPEG may be generated as the light simulation data. The light simulation data generation section 120 stores the generated light simulation data in the light simulation data cache section 114 (step S4193). This method makes it possible to generate the light simulation data, regardless of the format of the display data.

FIG. 6 is a diagram showing the flow of the input notification process performed by the display control device 110 according to the first embodiment of the present invention. This is details of the input notification process (step S420) shown in FIG. 4. Referring to FIG. 6, when having determined that it is not necessary to make a screen transition, the screen transition control section 113 sends the received input to the input switching section 117, and starts the process.

The input switching section 117 determines whether or not input is currently prohibited (step S4201). When input is not prohibited ("NO" in step S4201), the input switching section 117 notifies the display data processing section 119 of the received input (step S4202). The display data processing section 119 switches screen images as necessary in accordance with the input whose notification has been given, and sends the switching result image to the display section 116 to thereby update the screen (step S4203). In addition, at this time, when it is necessary to make a transition to another screen that is not contained in the display data in processing, the display data processing section 119 requests the screen transition control section 113 to make a screen transition, while specifying the screen identifier of the transition target.

On the other hand, when input is prohibited ("YES" in step S4201), the input switching section 117 discards the received input, and ends the process.

FIG. 7 is a flow chart showing a data transmission process performed by the display data server 100 according to the first embodiment of the present invention. Here, FIG. 7(*a*) shows the process performed when the display data server 100 has received from the display control device 110 a request for light simulation data, and FIG. 7(*b*) shows the process performed when the display data server 100 has received from the display control device 110 a request for display data.

Referring to FIG. 7(*a*), when having received from the display control device 110 a request for light simulation data (step S501), the display data distribution section 102 acquires light simulation data corresponding to the specified screen identifier from the display data storage section 101, transmits the acquired light simulation data to the display control device 110 (step S502), and ends the process.

Referring to FIG. 7(*b*), when having received from the display control device 110 a request for display data (step S511), the display data distribution section 102 acquires display data corresponding to the specified screen identifier from the display data storage section 101, transmits the acquired display data to the display control device 110 (step S512), and ends the process. Note that here, an example is shown where the light simulation data corresponding to the screen identifier is necessarily stored in the display data storage section 101; however, when not all pieces of light simulation data are prepared, one piece of light simulation data that is common to the system may be stored in advance in the display data storage section 101, so that when the light simulation data corresponding to the specified screen identifier is not present, the one piece of light simulation data that is common to the system is sent.

With this structure, in the display control device 110, the display acquisition section 112 can acquire light simulation data that has small data size, and the screen generation section 111 can generate a screen based on the light simulation data and display the transition target screen in a simulated manner, until after the transition target screen based on normal display data is displayed.

Further, in the display control device 110, the light simulation data cache section 114 stores light simulation data that has been used for display in the past, and therefore it is possible to increase the speed of a transition to a screen that has been displayed in the past, by a method that is efficient in the amount of memory consumption as compared to the method of storing display data in the display control device 110.

Further, in the display control device 110, even in the case of an infrequently used screen, it is possible, using light simulation data, to display in a simulated manner a screen to be displayed after the switching. Thus it is possible to reduce the time until the subsequent screen is displayed, and to provide a comfortable operational feeling without making the user feel a delay of the screen transition process.

Note that in the present embodiment an example is shown where a screen transition is made based on a user's operation; however, a screen transition may be made based on an outside communication to the device, such as an incoming call or e-mail reception, or based on a change in the state of the device, such as a battery voltage drop.

Note that in the present embodiment an example is shown where if light simulation data is present in the light simulation data cache section 114, the light simulation data is used; however, in a given case, even if light simulation data is present in the light simulation data cache section 114, light simulation data may be reacquired from the display data server 100. For example, a time stamp may be stored in advance that indicates the time when light simulation data has been stored in the light simulation data cache section 114, and an inquiry may be made to the display data server 100 as to whether or not display data has been updated since the date of storing the light simulation data. When display data has been updated, even if light simulation data is present in the light simulation data cache section 114, light simulation data may be reacquired from the display data server 100.

Note that in the present embodiment the display control device 110 is provided with the light simulation data generation section 120, in consideration of the case where light simulation data is not sent, such as when a particular failure occurs to the display data server 100, and also in consideration of the connectivity with the display data server 100 that does not support the mechanism of light simulation data. However, when the display data server 100 can assure the provision of light simulation data, the light simulation data generation section 120 may be eliminated. In addition, when the display data server 100 does not include the mechanism of generating light simulation data, light simulation data generated in the display control device 110 may be sent to the display data server 100.

Note that in the present embodiment an example is shown where the input switching section 117 discards an input received while input is prohibited; however, when an input is not desired to be discarded, the inputs received until input is resumed may be cached, and when a request to resume input has been received, the display data processing section 119 may be notified of the cached inputs.

Further, the display control device 110 can switch processes so as to cancel the acquisition of light simulation data and to acquire only display data from the display data server 100. This makes it possible that, for example, when congestion occurs in a communication with the display data server 100, the acquisition of light simulation data is canceled to thereby reduce data transmission for the acquisition of light simulation data.

Second Embodiment

Figure 8:
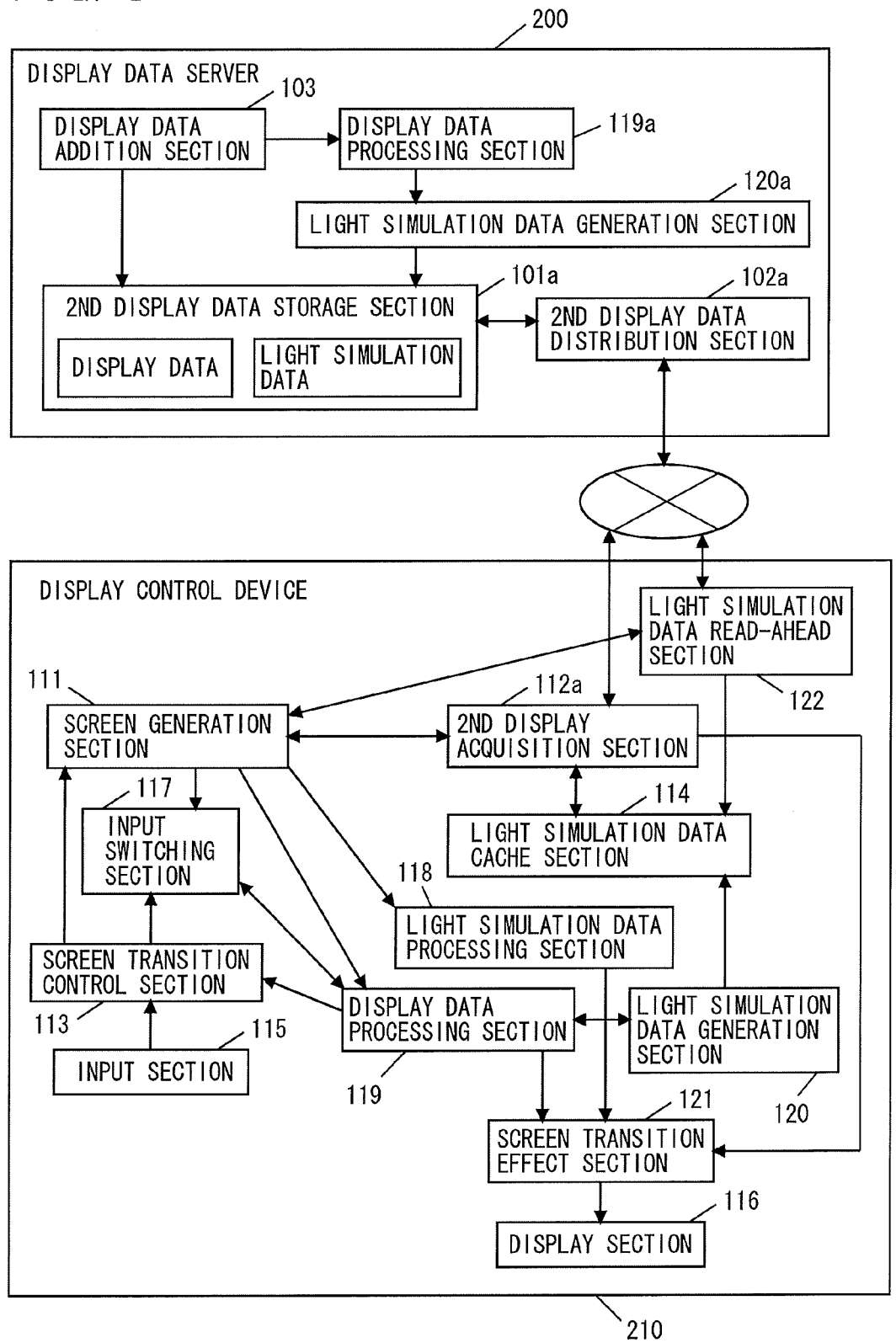
FIG. 8 is a block diagram showing an example of the structure of a display control system according to a second embodiment of the present invention.

FIG. 8 is a block diagram showing an example of the structure of a display control system according to a second embodiment of the present invention. Referring to FIG. 8, the display control system includes a display data server 200 and a display control device 210. Note that the same components as those of the first embodiment (FIG. 1) are denoted by the same numerals and are not described in detail.

The display data server 200 further includes a display data addition section 103, a display data processing section 119a, and a light simulation data generation section 120a, in addition to the components of the first embodiment. Furthermore, the display data server 200 includes a second display data storage section 101a instead of the display data storage section 101, and a second display data distribution section 102a instead of the display data distribution section 102.

The display control device 210 further includes a light simulation data read-ahead section 122 and a screen transition effect section 121, in addition to the components of the first embodiment. Furthermore, the display control device 210 includes a second display acquisition section 112a instead of the display acquisition section 112.

Referring to FIG. 8, the light simulation data read-ahead section 122 manages information about how frequently the screen generation section 111 has generated a screen in the past, with respect to each screen identifier. When light simulation data corresponding to the screen identifier of a frequently generated screen is not stored in the light simulation data cache section 114, the light simulation data read-ahead section 122 acquires the light simulation data from the display data server 100, and stores therein the acquired light simulation data. Alternatively, when light simulation data corresponding to the screen identifier of an infrequently generated screen is stored in the light simulation data cache section 114, the light simulation data read-ahead section 122 deletes the light simulation data.

The screen transition effect section 121 has stored therein a screen image that is currently being displayed on the display section 116; combines, if a new screen image is output from the display data processing section 119 or the light simulation data processing section 118 when a screen transition is made, the currently displayed screen image with the newly generated screen image; and outputs the combined result image to the display section 116 to thereby provide a screen transition effect.

FIG. 9 shows examples of the screen transition effect provided by the screen transition effect section 121. As shown in FIG. 9, the screen transition effect section 121 has a plurality of display effect patterns so as to, for example, change the display positions and the sizes of a transition source screen A and a transition target screen B to combine the screen images, or make blending combination by α-blending, in accordance with a set display effect pattern, to thereby provide a display effect, such as sliding, zooming, or fading, to be used when a screen transition is made.

The second display acquisition section 112a receives from the screen generation section 111 a request to acquire display data, and checks whether or not light simulation data corresponding to the specified screen identifier is present in the light simulation data cache section 114. As a result of the check, when the light simulation data is present, the second display acquisition section 112a immediately notifies the screen generation section 111 of the presence, and requests the display data server 200 to acquire display data corresponding to the screen identifier. When the light simulation data is not present, the second display acquisition section 112a requests the display data server 200 to acquire the light simulation data and the display data.

Further, when having received the light simulation data and the display data from the display data server 200, the second display acquisition section 112a sends the received light simulation data and display data to the screen generation section 111. In addition, the second display acquisition section 112a stores in the light simulation data cache section 114 the light simulation data received from the display data server 200. Moreover, when requesting the light simulation data from the display data server 200, the second display acquisition section 112a determines a suitable light simulation data type based not only on the screen identifier but also on the display effect pattern that is set in the screen transition effect section 121, and notifies the display data server 200 of the determined light simulation data type.

This causes the second display acquisition section 112a to acquire the light simulation data that is suitable for the display effect pattern. As a specific example, the correspondences between the display effect patterns and the light simulation data types are shown in FIG. 10. As shown in FIG. 10, the second display acquisition section 112a notifies the display data server 200 of a small-amount-of-data type as a display effect pattern, which is the light simulation data type corresponding to a small amount of data, in the case of fading or zooming, where it is difficult to visually identify the screen image of the subsequent screen. Alternatively, the second display acquisition section 112a notifies the display data server 200 of a large-amount-of-data type as a display effect pattern in the case of no transition effect or sliding, where it is easy to visually identify the screen image of the subsequent screen. Thus the second display acquisition section 112a requests the display data server 200 to acquire the light simulation data.

The display data addition section 103 is a block for dynamically adding display data developed by a display data developer to the display data server 200. When display data is input to the display data addition section 103 via a network or the like, the display data addition section 103 stores the input display data in the second display data storage section 101a, and sends the stored display data to the display data processing section 119a.

The display data processing section 119a performs similar processes to those performed by the display data processing section 119 of the display control device 210, to thereby generate a screen image and send the generated screen image to the light simulation data generation section 120a.

The light simulation data generation section 120a performs similar processes to those performed by the light simulation data generation section 120 of the display control device 210, to thereby convert a screen image generated by the display data processing section 119a into a compressed image format and store in the second display data storage section 101a the compressed image as light simulation data. At this time, the amount of reduction in number of colors and pixels is changed to generate several types of the light simulation data that are different in the amount of data. Note that only one type of the light simulation data may be generated without the process of generating several patterns of the light simulation data.

The second display data storage section 101a has stored therein display data and light simulation data corresponding to the display data, and can have stored therein a plurality of pieces of the light simulation data for the light simulation data types, respectively, with respect to each screen identifier. A case is shown in FIG. 11 as an example, where as the light simulation data types, a "large-amount-of-data" type and a "small-amount-of-data" type are provided.

The second display data distribution section 102a receives a request from the display control device 210, and sends, to the display control device 210 via the network, display data or light simulation data, each corresponding to the screen identifier and the light simulation data type whose notification have been given by the display control device 210, based on the screen identifier and the light simulation data type, the display data and the light simulation data being contained in those stored in the second display data storage section 101a.

Thus, the light simulation data read-ahead section 122 can acquire only light simulation data before a screen transition is made, and therefore it is possible to display a subsequent screen at high speed in a simulated manner, by a method that is efficient in the amount of memory consumption.

Further, the second display acquisition section 112a acquires light simulation data that is suitable for a screen transition effect, and therefore it is possible to further reduce light simulation data in size when a screen transition effect such as zooming in or fading in is provided, where it is difficult for the user to clearly recognize details of the contents of the subsequent screen.

Further, in the display data server 200, the light simulation data generation section 120a generates light simulation data corresponding to newly added display data, and therefore it is not necessary for a display data developer to separately input light simulation data. This makes it possible to improve the development efficiency of display data. In addition, it is possible to register display data by a similar process to that performed in a server that has yet to introduce the present invention, and therefore it is not necessary for a display data developer to be aware of light simulation data.

A screen transition process performed by the display control device 210 according to the present embodiment includes similar parts to those of the first embodiment, and therefore only the differences between these processes are described with reference to FIG. 4.

Referring to FIG. 4, the process performed in steps S401 through S403 is similar to that of the first embodiment, and therefore is not described. In step S404, when requesting light simulation data from the display data server 200, the second display acquisition section 112a specifies, in addition to the screen identifier specified by the screen generation section 111 and in accordance with the correspondences shown in FIG. 10, a light simulation data type corresponding to the display effect pattern that is set in the screen transition effect section 121 so as to be used when the screen transition is made. The process performed in steps S405 through S413 is similar to that of the first embodiment, and therefore is not described. In step S414 a process is added where the screen transition effect section 121 combines the screen image generated by the light simulation data processing section 118 with a screen image that has been being displayed on the display section 116 until the screen transition is made, to thereby provide a screen transition effect.

Figure 12:
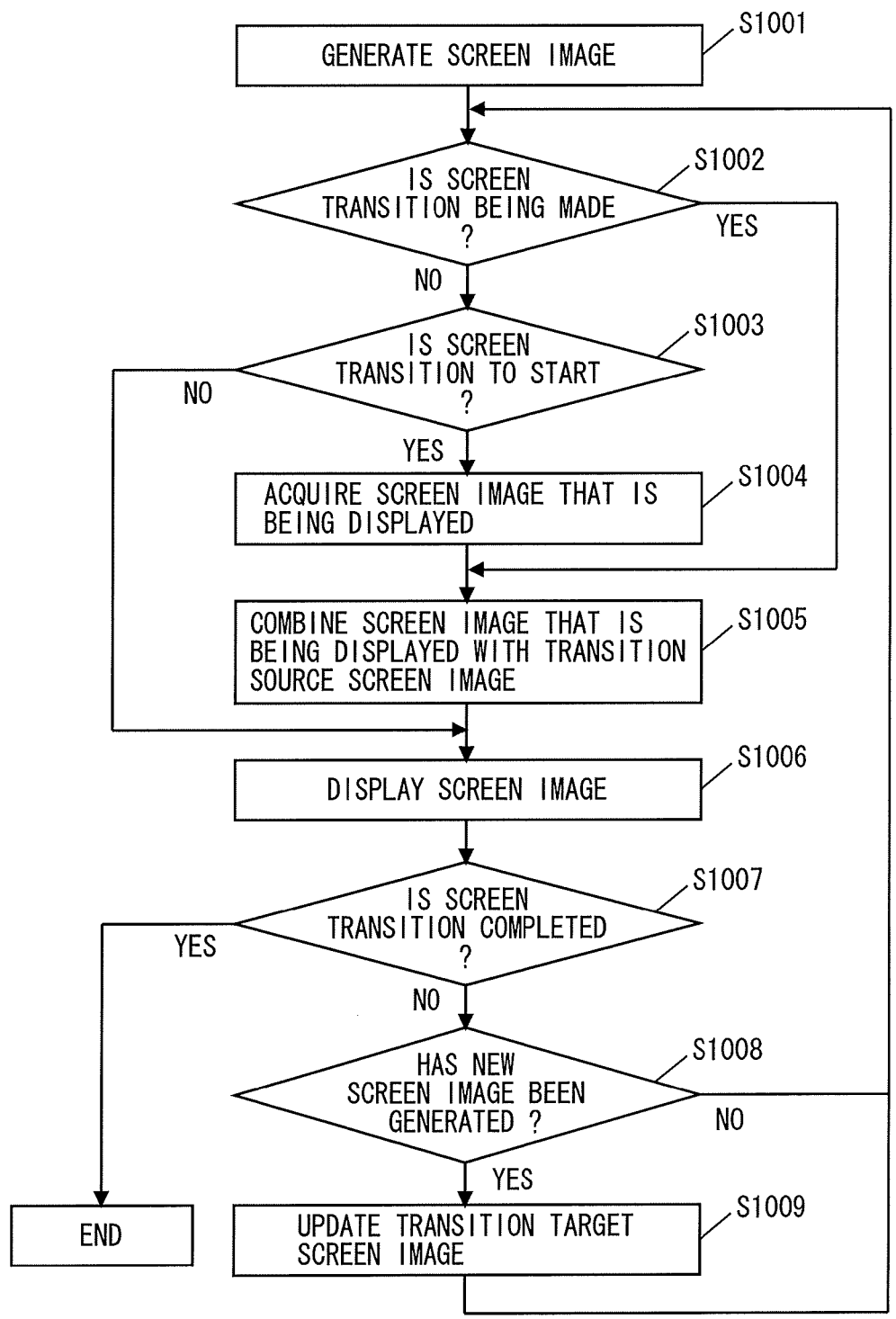
FIG. 12 is a flow chart showing a screen transition effect provision process performed by display control device 210 according to the second embodiment of the present invention.

FIG. 12 is a flow chart showing a screen transition effect provision process performed by the display control device 210 according to the present embodiment. This is the process added in step S414 of FIG. 4 as described above. Referring to FIG. 12, when a display target screen image has been sent by the light simulation data processing section 118 or the display data processing section 119 (step S1001), the screen transition effect section 121 determines whether or not a screen transition is currently being made (step S1002).

When a screen transition is being made ("YES" in step S1002), the process proceeds to step S1005. On the other hand, when a screen transition is not being made ("NO" in step S1002), the screen transition effect section 121 determines, by comparing the screen identifier of the sent screen image with the screen identifier of the screen image that is currently being displayed, whether or not a screen transition is to start (step S1003).

When the screen identifier of the sent screen image and the screen identifier of the screen image that is being displayed are different and a screen transition is to start ("YES" in step S1003), the screen transition effect section 121 acquires from the display section 116 the screen image that is currently being displayed, and stores therein the acquired screen image as a transition source screen image (step S1004). In accordance with the display effect pattern to be used when the screen transition is made as shown in FIG. 9, the screen transition effect section 121 combines the screen image to be displayed after the screen transition has been made, which has been sent by the light simulation data processing section 118 or the display data processing section 119, with the transition source screen image acquired in step S1004; generates a screen image to be displayed during the screen transition; and sets the generated screen image as a display target screen image (step S1005).

When the screen identifier of the sent screen image and the screen identifier of the screen image that is being currently displayed are the same and a screen transition is not to start ("NO" in step S1003), the screen transition effect section 121 sets the transition source screen image acquired in step S1004, as a display target screen image, and proceeds to step S1006.

The screen transition effect section 121 outputs the display target screen image to the display section 116, and causes a screen to be displayed on the display (step S1006). The screen transition effect section 121 determines whether or not the display effect to be provided when the screen transition is made is completed and the transition to the subsequent screen is completed (step S1007).

When the screen transition is completed ("YES" in step S1007), the process ends. On the other hand, when the screen transition is not completed ("NO" in step S1007), the screen transition effect section 121 checks whether or not a new screen image has been sent by the light simulation data processing section 118 or the display data processing section 119 (step S1008). At this time, when the process of steps S415 through 417 has been performed and the screen image based on the display data has already been generated in step S417, it is determined that a new screen image has been generated ("YES" in step S1008). Then the screen transition effect section 121 updates the transition target screen image to the screen image newly sent by the display data processing section 119 (step S1009), and returns to step S1002. When the acquisition of the display data has not succeeded in step S415 and the acquisition of the display data is waited for in step S416, it is determined that a new screen image has not been generated ("NO" in step S1008). The screen transition effect section 121 returns to step S1002 without updating the transition target screen image. Subsequently, this process is repeated until the screen transition process is completed.

In the case where the generation of the screen image based on the display data has not succeeded in step S417 by the time when the screen transition process is completed, when the generation of the screen image based on the display data has succeeded after the screen transition process is completed, the screen transition effect provision process is performed again in step S417. However, it is determined in both steps S1002 and S1003 that it is "NO". Then the screen image generated by the display data processing section 119 in step S1006 is output to the display section 116 as it is, and it is determined in step S1007 that the screen transition is completed. Subsequently, the process ends.

The data transmission process performed by the display data server 200 according to the second embodiment of the present invention is different from that of the first embodiment as described above in FIG. 5 only in that light simulation data corresponding to the screen identifier and the light simulation data type is acquired in steps S502 and S512. Therefore the other parts are not described.

Note that in this case, when light simulation data corresponding to the specified screen identifier and the light simulation data type is not present, the display data server 200 may send given data that has the same screen identifier, or may send light simulation data that is common to the system, as in the first embodiment.

Figure 13:
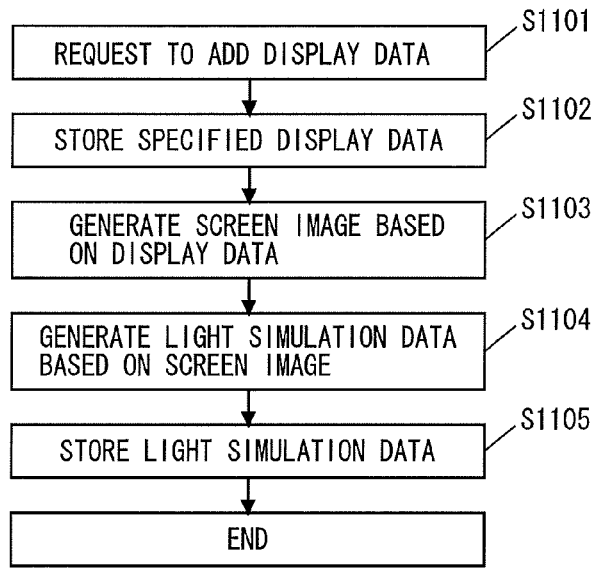
FIG. 13 is a flow chart showing a display data addition process according to a display data server 200 according to the second embodiment of the present invention.

FIG. 13 is a flow chart showing a display data addition process performed by the display data server 200 according to the second embodiment of the present invention. Referring to FIG. 13, when requested to add display data while a screen identifier is specified (step S1101), the display data addition section 103 stores, in the second display data storage section 101a, display data corresponding to the specified screen identifier, and notifies the display data processing section 119a of the screen identifier of the stored display data (step S1102).

The display data processing section 119a performs similar processes to those performed by the display data processing section 119 of the display control device 110, to thereby generate a screen image based on the display data (step S1103). The light simulation data generation section 120a performs similar processes to those performed by the light simulation data generation section 120 of the display control device 110, to thereby generate light simulation data (step S1104). Finally, the light simulation data generation section 120a stores the generated light simulation data in the second display data storage section 101a (step S1105), and ends the process.

Figure 14:
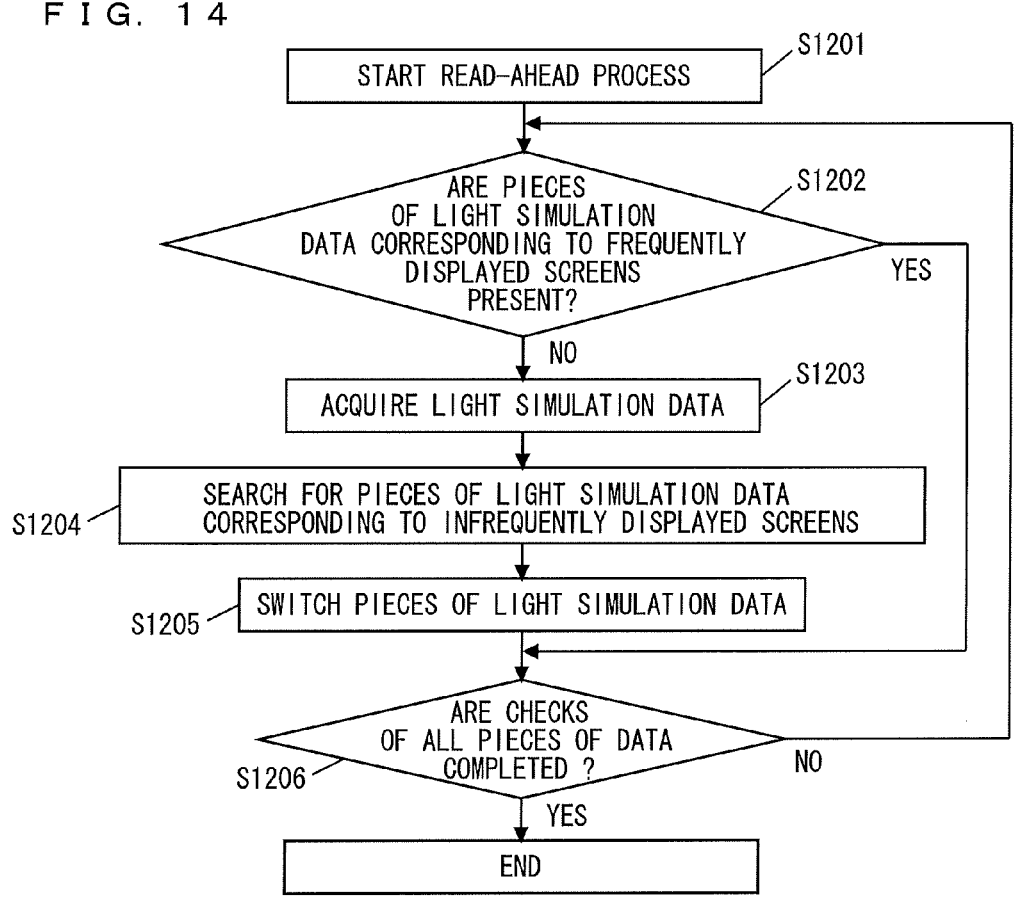
FIG. 14 is a flow chart showing a light simulation data read-ahead process performed by the display control device 210 according to the second embodiment of the present invention.

FIG. 14 is a flow chart showing a light simulation data read-ahead process performed by the display control device 210 according to the second embodiment of the present invention. Referring to FIG. 14, when requested to start a read-ahead process (step S1201), the light simulation data read-ahead section 122 checks frequently displayed screens, and checks whether or not pieces of light simulation data corresponding to the checked screens are stored in the light simulation data cache section 114 (step S1202).

Specifically, if the light simulation data cache section 114 caches therein pieces of light simulation data corresponding to 10 screens, the light simulation data read-ahead section 122 checks, in order from a screen whose display frequency ranks first to a screen whose display frequency ranks tenth, whether or not pieces of light simulation data corresponding to the screens are present in the light simulation data cache section 114. Here, the read-ahead process may be started each time a screen transition is made, or may be started periodically when a given period of time has elapsed. Alternatively, the system load may be checked so that the read-ahead process is started when the load is low, such as during an idle period.

When pieces of light simulation data corresponding to the frequently displayed screens are present ("YES" in step S1202), the light simulation data read-ahead section 122 determines whether or not the checks of all the top ten screens are completed (step S1206). When the checks of all the top ten screens are completed ("YES" in step S1206), the process ends. When the checks are not completed ("NO" in step S1206), the process returns to step S1202 and is performed on screens that have not yet been checked.

On the other hand, when pieces of light simulation data corresponding to the frequently used screens are not present ("NO" in step S1202), the light simulation data read-ahead section 122 acquires the piece of light simulation data from the display data server 200 (step S1203).

Subsequently, the light simulation data read-ahead section 122 searches for pieces of light simulation data corresponding to screens whose use frequencies rank below the top ten and stored in the light simulation data cache section 114 (step S1204). In the region where the pieces of light simulation data corresponding to the infrequently used screens and detected in step S1204 have been stored, the pieces of light simulation data corresponding to the frequently used screens and acquired in step S1203 are overwritten (step S1205).

Then the light simulation data read-ahead section 122 determines whether or not the checks of all the top ten frequently used screens are completed (step S1206). When the checks are completed ("YES" in step S1206), the process ends.

With this structure, the light simulation data read-ahead section 122 acquires only light simulation data before a screen transition is made, and therefore it is possible to display a subsequent screen at high speed in a simulated manner, by a method that is efficient in the amount of memory consumption as compared to the method of reading display data ahead.

Further, the second display acquisition section 112a acquires light simulation data that is suitable for a screen transition effect, and therefore it is possible to further reduce light simulation data in size when a screen transition effect such as zooming in or fading in is provided, where it is difficult for the user to clearly recognize details of the contents of the subsequent screen.

Further, in the display data server 200, the light simulation data generation section 120a generates light simulation data corresponding to added display data, and therefore it is not necessary for a display data developer to separately input a simulated image. This makes it possible to improve the development efficiency of display data. In addition, it is possible to register display data by a similar process to that performed in a server that has yet to introduce the present invention, and therefore it is not necessary for a display data developer to be aware of light simulation data.

Note that in the present embodiment an example is shown where the display control device 210 reads frequently used screens ahead; however, screens to which a transition is likely to be made from the screen that is currently being displayed may be read ahead.

Note that in the present embodiment an example is shown where the light simulation data cache section 114 does not make a distinction in accordance with the light simulation data types; however, data may be cached on a type-by-type basis.

Note that in the present embodiment an example is shown where data sizes are used for the light simulation data types; however, data formats, such as a script or a compressed image, may be used. Note that the second display acquisition section 112a changes light simulation data types based on a display effect pattern; however, light simulation data types may be changed based on, for example, the display performance of the display control device 110, or the presence or absence of the function of a decoder, a script processing engine, or the like.

Note that in the present invention, each of the functional blocks that form the display control device, the display data server, and the display control system may typically be realized as a program executed on a CPU; however, all or some of the functional blocks may also be realized as LSIs, each being an integrated circuit. Each LSI may be separately manufactured as a single chip, or all or some of the LSIs may be manufactured as a single chip. The integrated circuit is here referred to as an LSI, but may be referred to as an IC, a system LSI, a super LSI, an ultra LSI, etc., depending on the degree of integration.

Further, the method of integration is not limited to LSI, and may be realized by a dedicated circuit or a general-purpose processor. An FPGA (Field Programmable Gate Array), which is an LSI that can be programmed after manufacture, or a reconfigurable processor capable of reconfiguring the connections and the settings of the circuit cells in the LSI may also be used.

Furthermore, in the case where another integration technology replacing LSI becomes available due to improvement of a semiconductor technology or due to the emergence of another technology derived therefrom, integration of the functional blocks may be performed using such a new integration technology. For example, biotechnology may be applied to the integration described above.

INDUSTRIAL APPLICABILITY

The display control device according to the present invention is useful for an information device, a communication device, a household electrical appliance, and the like, each having the function of acquiring, from a server via a network, data for displaying a screen.

The invention claimed is:

1. A display control device for displaying a screen image based on display data acquired via a network, the display control device comprising:
   a screen transition control section that (i) receives an event according to which a screen image transition based on the display data occurs and (ii) provides an instruction to perform the screen image transition;
   a light simulation data processing section that generates the screen image based on light simulation data;
   a display data processing section that generates the screen image based on (i) the display data and (ii) the event for which a notification has been received while a current screen image is currently displayed;
   a screen generation section that (i), when having received the instruction to perform the screen image transition from the screen transition control section, requests an acquisition of target display data which is display data that corresponds to a transition target screen image, so as to acquire the target display data and target light simulation data corresponding to the target display data, (ii) requests the light simulation data processing section to generate the screen image of the target light simulation data, and (iii) requests the display data processing section to generate the screen image of the target display data;
   a display acquisition section that, when having received the request to acquire the target display data from the screen generation section, (i) outputs to the network a request to acquire the target display data and the target light simulation data, and (ii) acquires the target light simulation data and the target display data from the network;
   a display section that, after the screen image generated by the light simulation data processing section based on the target light simulation data is displayed thereon, changes the display of the screen image generated by the light simulation data processing section to a display of the screen image generated by the display data processing section based on the target display data; and
   an input switching section that prohibits a change to display the screen image corresponding to the event according to which the screen image transition based on the display data occurs, before the display of the screen image based on the target light simulation data is changed to the display of the screen image based on the target display data.

2. The display control device according to claim 1, further comprising a light simulation data cache section that temporarily stores the target light simulation data acquired by the display acquisition section,
wherein, when the target light simulation data is present in the light simulation data cache section, the display acquisition section acquires the target light simulation data from the light simulation data cache section.

3. The display control device according to claim 1, further comprising a screen transition effect section that combines the screen image generated by one of the light simulation data processing section and the display data processing section with the currently displayed screen image that is currently being displayed on the display section, so as to provide a screen transition effect.

4. The display control device according to claim 3, wherein the display acquisition section outputs, to the network, a request to acquire the light simulation data of a type determined based on the screen transition effect provided by the screen transition effect section.

5. The display control device according to claim 3, wherein the display acquisition section outputs, to the network, a request to acquire the light simulation data having a data size determined based on the screen transition effect provided by the screen transition effect section.

6. The display control device according to claim 1, wherein the display section acquires, from the light simulation data processing section, the screen image that is based on the target light simulation data, and acquires, from the display data processing section, the screen image that is based on the target display data, without using the network.

7. The display control device according to claim 1, further comprising a light simulation data cache section that temporarily stores the light simulation data acquired by the display acquisition section,
wherein, in a case where the display acquisition section receives, from the screen generation section, a request to acquire the target display data:
when the target light simulation data is included in the light simulation data stored in the light simulation data cache section, the display acquisition section acquires the target light simulation data from the light simulation data cache section, and acquires the target display data by outputting to the network a request to acquire the target display data; and
when the target light simulation data is not included in the light simulation data stored in the light simulation data cache section, the display acquisition section acquires the target light simulation data and the target display data by outputting to the network the request to acquire the target display data and the target light simulation data.

8. A display control system comprising a display data server for distributing display data requested via a network and a display control device for displaying a screen image based on the display data acquired from the display data server,
wherein the display control device comprises:
a screen transition control section that (i) receives an event according to which a screen image transition based on the display data occurs and (ii) provides an instruction to perform the screen transition;
a light simulation data processing section that generates the screen image based on light simulation data;
a display data processing section that generates the screen image based on (i) the display data and (ii) the event for which a notification has been received while a current screen image is currently displayed;
a screen generation section that (i), when having received the instruction to perform the screen image transition from the screen transition control section, requests an acquisition of target display data which is display data that corresponds to a transition target screen image, so as to acquire the target display data and target light simulation data corresponding to the target display data, (ii) requests the light simulation data processing section to generate the screen image of the target light simulation data, and (iii) requests the display data processing section to generate the screen image of the target display data;
a display acquisition section that, when having received the request to acquire the target display data from the screen generation section, (i) outputs to the network a request to acquire the target display data and the target light simulation data, and (ii) acquires of the target light simulation data and the target display data from the network;
a display section that, after the screen image generated by the light simulation data processing section based on the target light simulation data is displayed thereon, changes the display of the screen image generated by the light simulation data processing section to a display of the screen image generated by the display data processing section based on the target display data; and
an input switching section that prohibits a change to display the screen image corresponding to the event according to which the screen image transition based on the display data occurs, before the display of the screen image based on the target light simulation data is changed to the display of the screen image based on the target display data, and
wherein the display data server comprises:
a display data storage section that stores the display data and the light simulation data corresponding to the display data;
a display data distribution section that receives the request to acquire the target display data and the target light simulation data, and, based on the received request, outputs to the network the target display data and the target light simulation data stored in the display data storage section;
a display data addition section that stores newly input display data in the display data storage section; and
a light simulation data generation section that generates the screen image based on the newly input display data stored by the display data addition section, generates, from the screen image generated based on the newly input display data, the light simulation data corresponding to the newly input display data, and stores the generated light simulation data in the display data storage section.

9. A method of displaying a screen image based on display data acquired via a network, the method comprising the steps of:
receiving an event according to which a screen image transition based on the display data occurs and providing an instruction to perform the screen image transition;

requesting, when having received the instruction to perform the screen image transition, an acquisition of target display data which is display data that corresponds to a transition target screen image;

outputting to the network a request to acquire the target display data and target light simulation data corresponding to the target display data, and acquiring the target light simulation data and the target display data from the network;

requesting a generation of the screen image based on the acquired target light simulation data;

generating, in accordance with the generation request to generate the screen image based on the acquired target light simulation data, the screen image based on the target light simulation data;

displaying the screen image generated based on the target light simulation data;

requesting a generation of the screen image based on the acquired target display data;

generating, in accordance with the generation request to generate the screen image based on the acquired target display data and the event for which a notification has been received while a current screen image is currently displayed, the screen image based on the target display data;

changing the display of the screen image generated based on the target light simulation data to a display of the screen image generated based on the target display data; and prohibiting a change to display the screen image corresponding to the event according to which the screen image transition based on the display data occurs, before the display of the screen image based on the target light simulation data is changed to the display of the screen image generated based on the target display data.

10. A method performed by a display control system having a display data server for distributing display data requested via a network and a display control device for displaying a screen image based on the display data acquired from the display data server, the method comprising the steps of:

receiving via, the display control device, an event according to which a screen image transition based on the display data occurs and providing an instruction to perform the screen image transition;

requesting, via the display control device and when having received the instruction to perform the screen image transition, an acquisition of target display data which is display data that corresponds to a transition target screen image;

outputting, via the display control device, to the network a request to acquire the target display data and target light simulation data corresponding to the target display data, and acquiring the target light simulation data and the target display data from the network;

requesting, via the display control device, a generation of the screen image based on the acquired target light simulation data;

generating, via the display control device and in accordance with the generation request to generate the screen image based on the acquired target light simulation data, the screen image based on the target light simulation data;

displaying, via the display control device, the screen image generated based on the target light simulation data;

requesting, via the display control device, a generation of the screen image based on the acquired target display data;

generating, via the display control device and in accordance with the generation request to generate the screen image based on the acquired target display data and the event for which a notification has been received while a current screen image is currently displayed, the screen image based on the target display data;

changing, via the display control device, the display of the screen image generated based on the target light simulation data to a display of the screen image based on the target display data; and prohibiting, via the display control device, a change to display the screen image corresponding to the event according to which the screen image transition based on the display data occurs, before the display of the screen image based on the target light simulation data is changed to the display of the screen image generated based on the target display data, wherein the display data server includes a display data storage section that stores the display data and light simulation data corresponding to the display data, and the method further comprises the steps of:

receiving, via the display data server and the network, a request to acquire the target display data and the target light simulation data;

outputting, via the display data server and based on the received, to the network the target display data and the target light simulation data included in the display data and the light simulation data stored in the display data storage section;

storing newly input display data in the display data storage section; and generating the screen image based on the stored newly input display data, generating, from the screen image generated based on the newly input display data, the light simulation data corresponding to the newly input display data, and storing the generated light simulation data in the display data storage section.

* * * * *